(12) United States Patent
Colenbrander et al.

(10) Patent No.: US 10,744,407 B2
(45) Date of Patent: Aug. 18, 2020

(54) DYNAMIC NETWORK STORAGE FOR CLOUD CONSOLE SERVER

(71) Applicant: Sony Computer Entertainment LLC, San Mateo, CA (US)

(72) Inventors: Roelof Roderick Colenbrander, Costa Mesa, CA (US); David Coles, Aliso Viejo, CA (US); Khiem Diep, Irvine, CA (US); Torgeir Hagland, Santa Ana, CA (US)

(73) Assignee: Sony Interactive Entertainment LLC, San Mateo, CA (US)

( * ) Notice: Subject to any disclaimer, the term of this patent is extended or adjusted under 35 U.S.C. 154(b) by 0 days.

(21) Appl. No.: 14/848,197

(22) Filed: Sep. 8, 2015

(65) Prior Publication Data

US 2017/0065887 A1 Mar. 9, 2017

(51) Int. Cl.

| | |
|---|---|
| *G06F 15/16* | (2006.01) |
| *A63F 13/355* | (2014.01) |
| *H04L 29/06* | (2006.01) |
| *H04L 29/08* | (2006.01) |
| *A63F 13/95* | (2014.01) |

(Continued)

(52) U.S. Cl.
CPC .......... *A63F 13/355* (2014.09); *A63F 13/352* (2014.09); *A63F 13/95* (2014.09); *H04L 65/4084* (2013.01); *H04L 67/1097* (2013.01); *A63F 13/23* (2014.09); *A63F 13/31* (2014.09); *A63F 2300/554* (2013.01)

(58) Field of Classification Search
None
See application file for complete search history.

(56) References Cited

U.S. PATENT DOCUMENTS 5,568,614 A 10/1996 Mendelson et al.
8,239,662 B1 * 8/2012 Nelson ................. G06F 9/4416
713/1

(Continued)

FOREIGN PATENT DOCUMENTS

| CN | 102857363 A | 1/2013 |
|---|---|---|
| CN | 104509048 A | 4/2015 |

(Continued)

OTHER PUBLICATIONS

International Search Report and Written Opinion for International Application No. PCT/US2016/041772, dated Oct. 11, 2016.

(Continued)

*Primary Examiner* — Padma Mundur
(74) *Attorney, Agent, or Firm* — JDI Patent; Joshua D. Isenberg; Robert Pullman

(57) ABSTRACT

Aspects of the present disclosure relate to systems and methods for virtualizing mass storage using a network storage device operatively coupled to a host system. In various implementations, the network storage device and host system may collectively emulate a mass storage device for another "terminal" computing system. This emulation can be performed while utilizing the minimum possible memory of the host system, as the network storage device contains the operating system data for the host system in addition to game and user data required for the implementation of a computer application.

22 Claims, 5 Drawing Sheets

(51) Int. Cl.
*A63F 13/352* (2014.01)
*A63F 13/31* (2014.01)
*A63F 13/23* (2014.01)

(56) References Cited

U.S. PATENT DOCUMENTS

| | | | |
|---|---|---|---|
| 8,793,364 B1* | 7/2014 | Barkelew | G06F 1/24 709/224 |
| 8,990,446 B2 | 3/2015 | Colenbrander | |
| 9,086,995 B2 | 7/2015 | Colenbrander | |
| 9,659,251 B2 | 5/2017 | Tang et al. | |
| 9,762,642 B2 | 9/2017 | Wang et al. | |
| 2007/0083522 A1* | 4/2007 | Nord | G06F 16/10 |
| 2010/0250919 A1* | 9/2010 | Newcombe | A63F 13/12 713/150 |
| 2013/0254261 A1* | 9/2013 | Nicholls | G06F 9/5027 709/203 |
| 2013/0304903 A1 | 11/2013 | Mick et al. | |
| 2014/0101341 A1 | 4/2014 | Colenbrander | |
| 2014/0101342 A1 | 4/2014 | Colenbrander | |
| 2014/0109184 A1 | 4/2014 | Lansing | |
| 2014/0344283 A1* | 11/2014 | Nicholls | H04L 65/1063 707/741 |
| 2015/0178018 A1 | 6/2015 | Colenbrander | |
| 2015/0181084 A1 | 6/2015 | Colenbrander | |
| 2015/0264298 A1 | 9/2015 | Colenbrander | |
| 2015/0301960 A1 | 10/2015 | Colenbrander | |
| 2016/0378534 A1* | 12/2016 | Oh | G06F 9/45558 718/1 |

FOREIGN PATENT DOCUMENTS

| | | |
|---|---|---|
| CN | 104798357 A | 7/2015 |
| EP | 2420952 A2 | 2/2012 |
| JP | H0855075 A | 2/1996 |
| WO | 2005002135 A1 | 1/2005 |
| WO | 2015094474 A1 | 6/2015 |

OTHER PUBLICATIONS

Office Action dated Feb. 19, 2019 for Japanese Patent Application 2018-506148.
Office Action dated Jun. 11, 2019 for Japanese Patent Application No. 2018-506148.
Office Action dated May 20, 2019 for Chinese patent application No. 201610805879.6.
Office Action dated Nov. 5, 2018 for Chinese Patent Application No. 201610805879.6.

* cited by examiner

DYNAMIC NETWORK STORAGE FOR CLOUD CONSOLE SERVER

FIELD

Aspects present disclosure relates to storage virtualization. Further aspects of the present disclosure relate to storage virtualization for cloud computing applications designed for embedded platforms.

BACKGROUND

With bandwidths and data transfer rates of telecommunication systems continuing to advance, many of today's computing needs are shifting towards network-based distributed computing systems, commonly referred to as "cloud computing." Generally speaking, cloud computing involves offloading certain computing tasks to one or more remote computing resources and utilizing the remote computing resources to provide services. In many instances, the computing resources can be entirely or almost entirely offloaded to the cloud, with an end user's device providing little or no more than a user interface for the cloud computing task, allowing potentially any internet connected device to serve as a client for a particular application. Cloud computing has previously been implemented as a client-server model, with a remote server providing desired computing capabilities to a local client device, avoiding the need for the local client device to perform certain computing tasks on its own. More recently, cloud computing has evolved to encompass remote execution where elasticity of computational resources is provided by dynamically expanding and load balancing across resources. Cloud computing has become increasingly characterized by functions that run remotely but do not necessarily report back to local clients. Many functions run on cloud report to other functions on the cloud to enable elastic compute and dynamic allocation of resources.

Cloud computing has been adopted in a wide variety of computing services, including remote data storage solutions, music and video streaming services, and a wide variety of other consumer and business solutions. In general, cloud computing provides several well-known benefits, including increased efficiencies through the use of shared resources, increased flexibility in accessing content without restriction to a particular device, lower up-front costs when hardware upgrades become available, and other advantages.

One arena in which cloud computing has yet to achieve widespread adoption is in the ever popular field of video gaming. Video games, including personal computer (PC) games, home console games, handheld console games, and the like, remain a popular source of entertainment among consumers. With a large and ever growing collection of available video game titles, cloud gaming provides a particularly attractive solution to many video game demands. Ideally, within a cloud gaming framework a user would be able to instantly access any video game title from among a vast collection of remotely stored titles, without needing a physical copy of the game, without having to wait for the title to download, and without locally possessing the hardware system or resources needed to run the game. Unfortunately, implementing this type of service within a traditional cloud computing server design presents several technical challenges that have thus far prevented widespread adoption of cloud gaming for many video game platforms.

One challenge is that many of today's video games are very fast paced and action packed, with advanced graphics that require a significant amount of computing resources to render. Particularly in a video streaming based server design, in which all of the game computations and graphics rendering computations are performed remotely, the game needs be able to perform all these tasks and deliver a compressed audio/video stream to the client device with minimal to no perceptible latency in response to control inputs. Otherwise, this may disrupt the timing for the player and fail to replicate the responsiveness of a traditional locally executed gaming session.

Another challenge stems from the fact that there has traditionally been a distinction between PC games on the one hand, which are designed to run on personal computers, laptops, and other computing systems of a general purpose nature, and console games on the other hand, which are designed to run on specialized systems known as video game consoles. Video game consoles are typically designed as embedded platforms having unique computing architectures specially adapted for the video gaming environment. Using dedicated console hardware as a video gaming platform provides several benefits, particularly in the form of optimizing the hardware for the high computing resource demands of graphics rendering and gaming computations required to produce many of today's video games. As a result, while PC games have achieved some popularity, console games have traditionally dominated the video game market and may continue to do so in the future.

However, adapting video game consoles and other embedded platforms to a cloud streaming service presents several challenges. Extensive modifications of the hardware or software architecture of the specialized platform may present compatibility issues with applications designed for the specialized platform. As a result, traditional storage server and storage virtualization techniques are not a viable solution for cloud based streaming of applications designed for many of these platforms. Additionally, modern console architecture is constantly changing and being updated in response to user requirements and desires. Accordingly, problems may arise if a system utilized by a cloud streaming service has not been updated to the latest architecture.

It is within this context that the present disclosure arises.

SUMMARY

An implementation of the present disclosure may include a 'Game Server', which can be a console, a PC or even a virtual machine. This system ultimately implements a computer application for streaming to a remote client computing device, and in addition runs various services, for example, managing the system, starting applications, and streaming the application. Additional embodiments of the present disclosure include an optional Management Server, which manages the Game Server. The Management Server may, as examples, power the Game Server, allocating resources on a storage server, or initiate software updates. The Management Server may allocate storage on the Storage Server to be used by the Game Server. The Management Server may perform this function before powering the Game Server on.

During system startup, the Game Server attempts to load its operating system (or portions of it) from a Storage Server; information on how to access the Storage Server may be provided by the Management Server, for example, over DHCP. It is noted that Storage Server location is just one particular aspect of bootstrap configuration information that may be provided. By way of example, and not by way of limitation, the Management Server may also can provide other configuration information, such as networking, date/time, logging, host name and other per-host configuration.

In, although DHCP is probably the most common protocol, other protocols, such as TFTP, HTTP may be used. After powering the Game Server, the Management Server may perform operations to prepare the Game Server for streaming. The Game Server may then stream application data to a remote client computing device.

In another implementation of the present disclosure, a user may initiate a streaming session with a client computing device using a Streaming Client. The client computing device may then be assigned a Game Server by a Cloud Services operation or server. This Cloud Services operation may provide instructions and credentials to a Streaming Client allowing it to stream from a given Game Server. The Streaming Client may connect to a 'Streaming Service' on the Game Server over a network connection or the internet, e.g., over a TCP or UDP connection. Once connected to the Streaming Service, a streaming session may be initiated. During this time, user and application data is made available to the Game Server via a Storage Server. Once the Game Server has received the appropriate application, user, and operating system data needed to execute the application using the application data, the application may be executed by the Game Server and output generated by executing the application using the application data may be streamed to the Streaming Client.

BRIEF DESCRIPTION OF THE DRAWINGS

The teachings of the present disclosure can be readily understood by considering the following detailed description in conjunction with the accompanying drawings, in which.

DETAILED DESCRIPTION

Although the following detailed description contains many specific details for the purposes of illustration, anyone of ordinary skill in the art will appreciate that many variations and alterations to the following details are within the scope of the invention. Accordingly, the exemplary embodiments of the invention described below are set forth without any loss of generality to, and without imposing limitations upon, the claimed invention.

INTRODUCTION

Aspects of the present disclosure relate to systems and methods for virtualizing mass storage using a network storage device operatively coupled to a host system. In various implementations, the network storage device and host system may collectively emulate a mass storage device for another "terminal" computing system. This emulation can be performed while utilizing the minimum possible memory of the host system, as the network storage device contains the operating system data for the host system in addition to game and user data required for the implementation of a computer application.

Server Architecture

Figure 1:
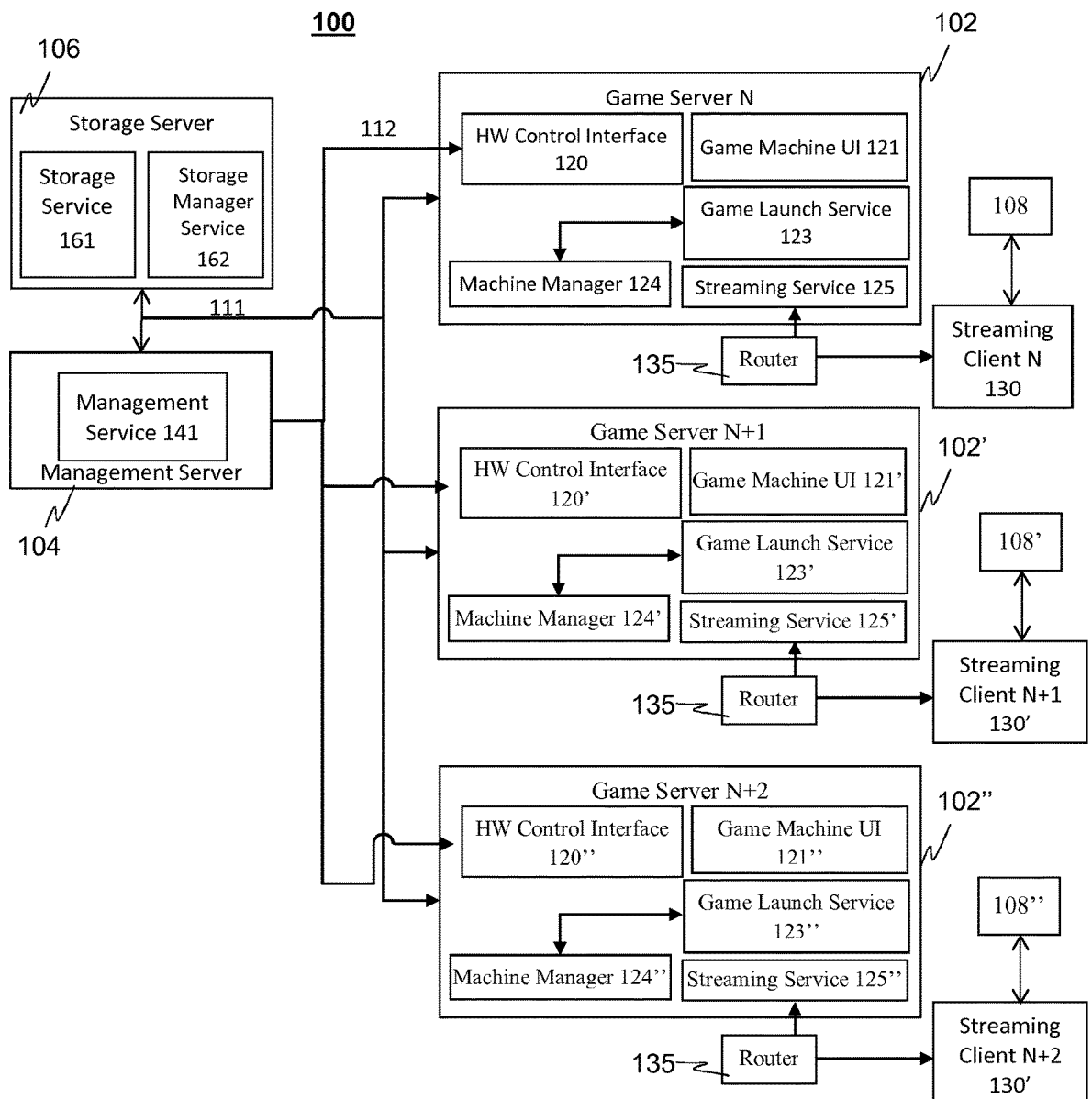
FIG. 1 is a block diagram illustrating a server architecture in accordance with an aspect of the present disclosure.

To better illustrate various aspects of the present disclosure, a first illustrative example of the server architecture 100 in accordance with an aspect of the present disclosure is depicted in FIG. 1. The server architecture 100 depicted in FIG. 1 involves a plurality of computing devices including a Game server 102, a Management Server 104, and a storage server 106 connected over a network, such as the internet or a local network 111. In certain implementations, not of all these devices need to have a connection to the external network 111. For example, the Game Server 102 may be reachable from the external network 111 for streaming purposes and to be able to play online multiplayer games. The Management Server 104 may support connection to the network 111 as some type of 'router' for streaming traffic. By way of example, and not by way of limitation, for normal internet traffic the Management Server may act like a standard network address translator (NAT) router.

In the example server architecture, a Game Server 102 streams an output of an application executed on the Game Server 102 to a remote client computing device 108. As used herein "execute" refers to running an application on a processor, such as a CPU. The client computing device may include, for example, a server, an embedded system, mobile phone, personal computer, laptop computer, tablet computer, portable game device, workstation, game console, wearable device such as a smart watch, virtual reality (VR) devices and/or augmented reality (AR) devices, such as "Google glasses" or Microsoft Hololens, and the like. The application output may be streamed over a network, such as the internet. The application output may additionally be streamed through an instance of a streaming client 130, which may be utilized to connect the client computing device 108 to the game server 102. By way of example, and not by way of limitation, the streaming client may be implemented in software executed by a computing device. The streaming client 130 may be assigned to a Game Server 102 via a Cloud Services application, and may communicate with the remaining system architecture via a streaming service 125.

It is noted that the Management Server 104 does not necessarily have to perform the streaming router/load-balancing role, thus like the Storage Server 106 does not necessarily require internet connectivity. In alternative implementations the server architecture 100 may optionally include a separate router 135 between the Streaming Service 125 and the Streaming Client 130. In some implementations one device may perform the functions of both the router 135 and the Streaming Client 130. In other implementations, the router function may be carried out by another device that is separate from the Streaming Client 130.

There are a number of ways in which the Cloud Services application may be implemented. In particular, behind the scenes various services related to billing, monitoring server availability, logging, etc. may take place. By way of example, and not by way of limitation, the Management Service 141 may report periodically to a 'Cloud Controller' how many Game Servers it manages, how many of these are in use, how many are 'broken' and how many are unused. In such an example, during session startup, a Streaming Client 130 performs some form of authentication to an 'Authentication Server' to verify if the user is allowed to play a certain game. On success, the Streaming Client 130 may perform an internet connection test, during which network bandwidth and latency to a number of nearby data centers may be measured in order to determine the best data center to stream from. Based on the test results a Cloud Controller assigns a Streaming Client 130 to an unused Game Server 102.

The connection test may also be done in parallel to authentication, for example to allow users to see if their network connection meets the minimum requirements to stream. Furthermore, a dedicated connection test may be skipped for situations in which there is high confidence that the properties of a user's connection can be predicted (for example, in the case of a subsequent stream from a known IP address).

In addition to performing authorization of streaming sessions, the 'Cloud Controller' may also perform server assignment. Such a system must balance various competing factors such as capacity, availability, queuing, network connectivity to the client, efficient hardware utilization, maintenance and external service dependencies when decided where and when to allocate a user to a streaming server.

In the illustrated example, multiple game servers (102, 102', 102", etc.) may be provided so that multiple client computing devices (108, 108', 108", etc.) may each connect to an independent game server in order to receive a stream of the output data of a particular application. Additionally, each respective client computing device 108 may utilize a particular instance of a streaming client (130, 130', 130", etc.) to connect to a game server 102.

The game server 102 may run various services related to executing an application and streaming the output of the executing application, including a game machine user interface 121, a game launch service 123, a machine manager 124 and/or a streaming service 125 capable of connecting to a client device 108 via a streaming client 130. An optional Management Server 104 manages the Game Server 102. The Management Server 104 may utilize a management service 141 to perform several functions, e.g., powering the Game Server 102, allocating resourced on a Storage Server 106 for use by the Game Server 102, and/or initializing software updates for the Game Server 102 and/or Storage Server 106. The Management Server 104 may be connected via a management bus 112 to the Game Server 102. Usually the various components of the server architecture 100 are already powered and placed in a ready-to-stream state to minimize startup delays. However, one or more components may be shut down from time to time for maintenance or power-saving reasons.

The Management Server 104 may utilize the management service 141 to turn the Game Server 102 on after allocating storage on the Storage Server 106 for use by the Game Server 102. Then, the Management Server 104 may power the Game Server 102 through a hardware control interface 120. The hardware control interface 120 may be utilized by the Management Server 104 via toggling a power switch signal using general purpose input output (GPIO). Alternatively, the Management Server 104 may utilize a wake up signal sent over local area network (LAN) or a universal asynchronous receiver/transmitter (UART) command port.

During startup, the Game Server 102 may attempt to load its operating system, or portions of it, from information stored by the Storage Server 106. As used herein "load" refers to the process of retrieving code and/or data from Mass Storage into Memory. The Storage Server 106 may run various services related to storage and delivery of application, operating system (OS), and/or user data to the Game Server 102, including a storage service 161 and a storage manager service 162; these aspects of the storage server will be discussed with respect to FIGS. 2-4. Information regarding access to the operating system data needed by the Game Server 102 may be provided to the Game Server by the Management Server 104, and may be provided over dynamic host configuration protocol (DHCP). Alternatively, the Storage Server 106 may provide this information, particularly in implementations for which the OS data is stored there. An advantage of doing this on the Management Server 104 is it acts as the ultimate authority on the Game Server 104 (from discovery and configuration through to run-time operation).

Once the Game Server 102 has been powered and has received the necessary application, user, and/or OS data from the Storage Server 106, the Management Server 104 may perform operations to prepare the Game Server 102 for streaming application output data to the client computing device 108. The Management Server 104 may utilize the management service 141 to instruct the machine manager 124 to start an application; the machine manager 124 then utilizes the game launch service 123 to start the application. If the Game Server 102 is successfully prepared, the Game Server 102 may stream an output of the application data to the client computing device 108.

The above-described server architecture allows for several ways in which an application or game can be initialized and its output data subsequently streamed to a client computing device.

However, it is understood that storage virtualization in accordance with principles herein may be implemented in other contexts, including cloud computing applications beyond game streaming, and local implementations where storage virtualization for a computing device is desired, particularly where it is desired without making modifications to the computing device.

Figure 2:
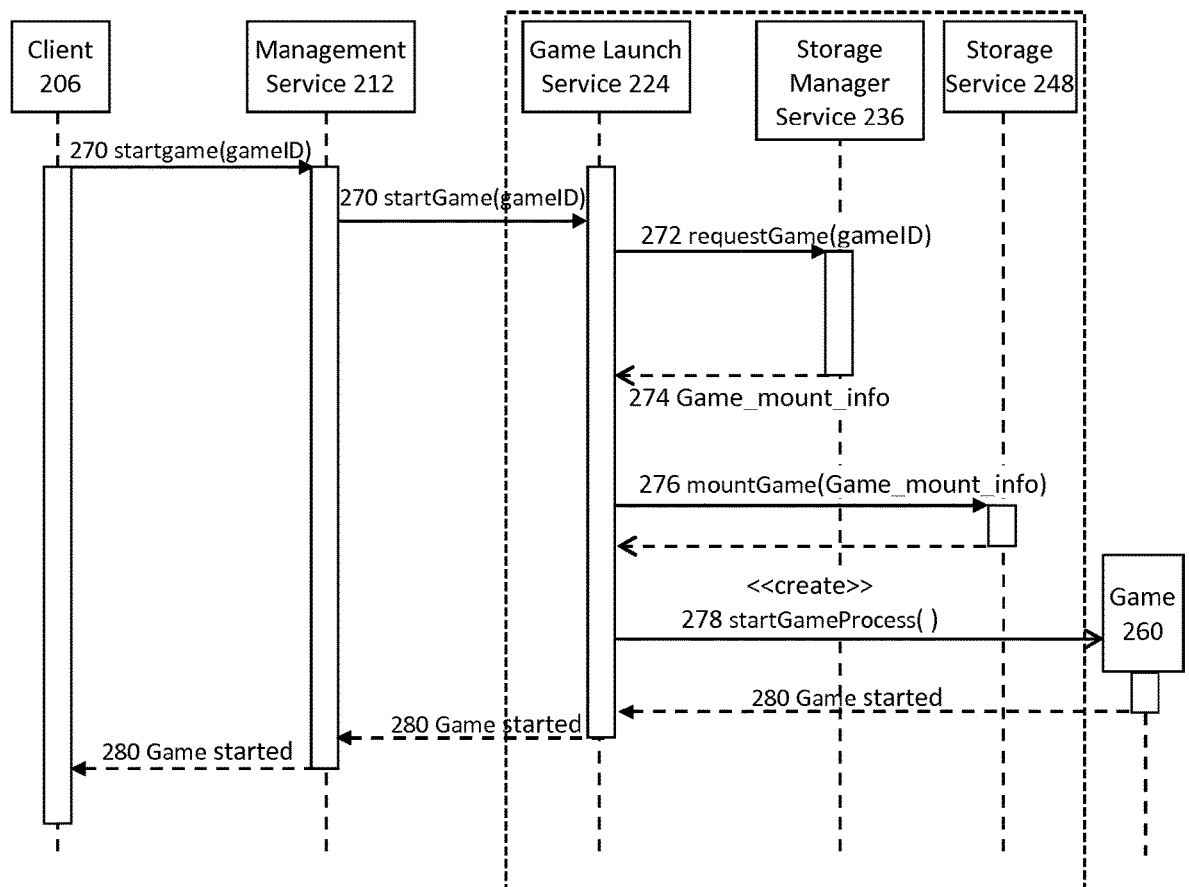
FIG. 2 is a flow diagram illustrating a client initiated game start in accordance with an aspect of the present disclosure.

An illustrative example of a method of initializing an application or game for streaming to a client computing device is provided with respect to FIG. 2. A client initiated game start 200 is depicted in FIG. 2, in which a user utilizes a streaming client 206 to send a request 270 to start a particular game "gameID". The request 270 is optionally sent through the Management Server and utilized by the management service 212 in order to perform those management functions as described with respect to FIG. 1 (powering on the Game Server, etc.). The request is delivered to the game launch service 224 on the Game Server. The game launch service 224 may then request 272 the game information from the storage manager service 236 located on the Storage Server. The storage manager service may check if the game is available for streaming and may additionally check if the requesting user is allowed to play the requested game. In alternative embodiments, such security checks may also be performed on the Management Server and elsewhere for additional security. If the user has the appropriate permissions to play the game, the storage manager service 236 makes the game available on the storage server and provides 'game_mount_info' credentials 274 back to the game launch service 224. In alternative implementations, this entitlement checking may also be done via a check of an external service (e.g., an online service associated with a game console such as PlayStation Network (PSN) from Sony Computer Entertainment) or the Cloud Controller.

In alternative implementations the game start 200 may come from the 'cloud', i.e., not directly from the client 206. In such implementations the 'Cloud Controller' mentioned earlier could effectively send an authentication result to the management service 212 directly. This can be advantageous, partly for design reasons and partly for security reasons. Specifically, in theory, a client could spoof the game name. This is more difficult to do when the game start doesn't come from the client device. The authentication result may contain the gameID, among other things. In other implementations the client 206 sends the authentication result to the management service 212.

In other alternative implementations, the game start 200 could be implemented with the client 206 doing startSession (launchRequest).

The game launch service 224 may then mount the game data "mountGame(Game_mount_info)" 276 from the Storage Server, where the game data 260 is stored. The storage service 248 controls the data transfer of the game data. Once the data 276 has been mounted correctly, the game launch service 224 may start the game "startGameProcess" 278, and the output data of the started game 280 may then be streamed to the streaming client 206 provided the streaming service (not shown, discussed with respect to FIG. 1) has initiated audio and video streaming to the streaming client 206.

User data or any other data not known ahead of time or that is to be accessed on demand, e.g., patches, DLC, media, debugging tools, etc., may also be mounted in such a fashion, and user data and user save game data may be available on the storage server or through cloud services, as discussed below. Usually access to user-data often precedes access to the application (for example to access system settings like language) but save data might not be accessed until the game application requests it.

Figure 4:
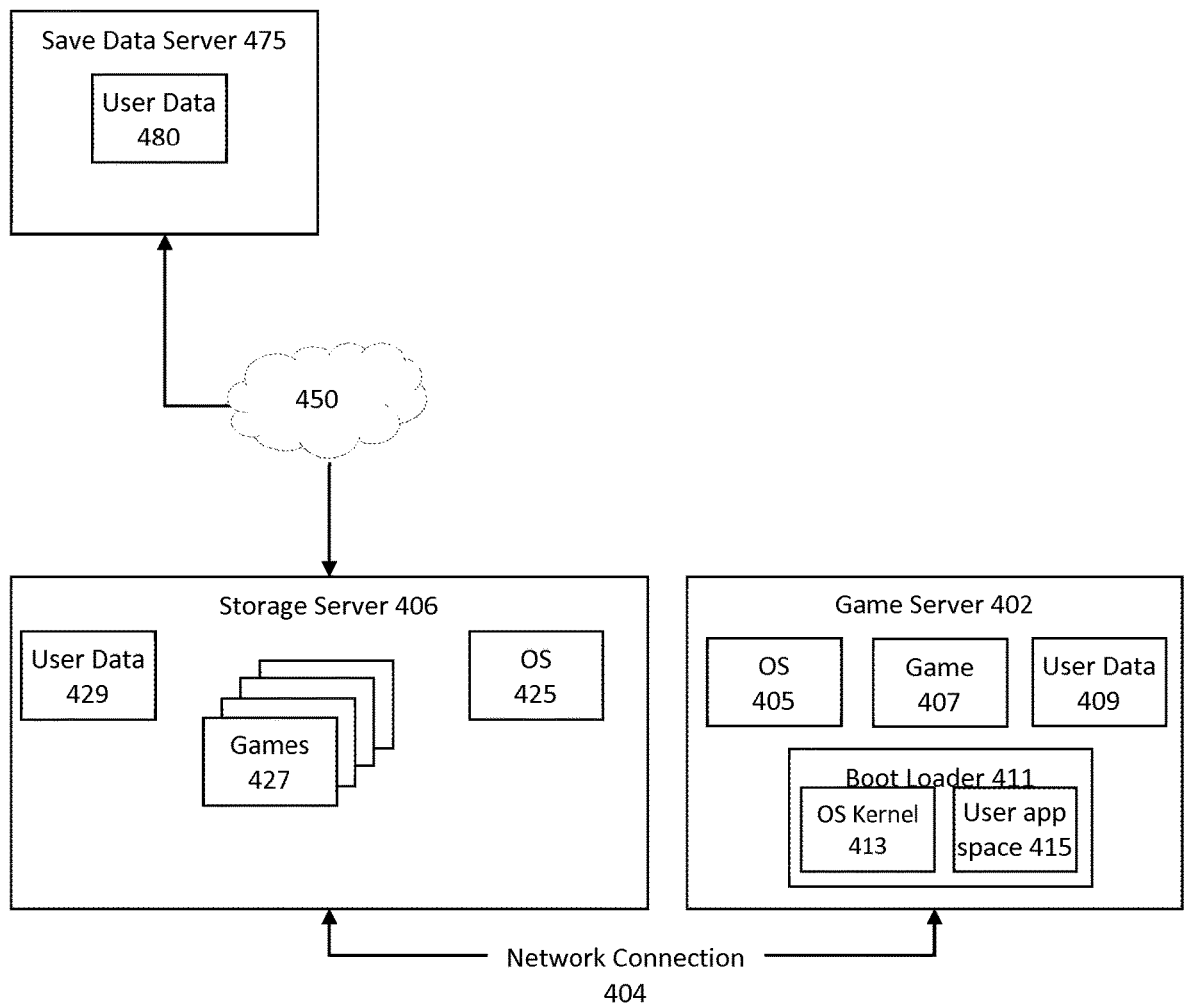
FIG. 4 is a block diagram of a storage architecture in accordance with an aspect of the present disclosure.

Upon streaming client 206 startup, a 'userID' may be passed from the streaming client 206 to the Game Server, which triggers obtaining access to the user's data stored in the Storage Server. The Storage Server again prepares the user data for the user, which may involve obtaining access to cloud storage if stored elsewhere; FIG. 4 highlights a potential storage architecture with respect to cloud storage. Ultimately, user_mount_info is returned to the Game Sever, which allows it to mount the user data. Depending on the architecture of the system, this mounting may be part of the game launch service 224 or there may be a user login service. In an alternative embodiment of the present disclosure, additional users may "join" a streaming session once the session has been started. An additional user may connect to the streaming session, for example, through the connection of a peripheral computing device to the client computing device that is streaming the game output data. In an alternative embodiment, an additional user may connect to the streaming session remotely, for example, via connection over a network to the streaming session as permitted by the features of the client device network. Once an additional user has connected or requested a connection to the streaming session, the streaming client 206 may notify the Game Server to add an additional user. The additional user would be added to the streaming session in a manner similar to the above-described manner of mounting user and game data for the user initially requesting the streaming session.

Figure 3:
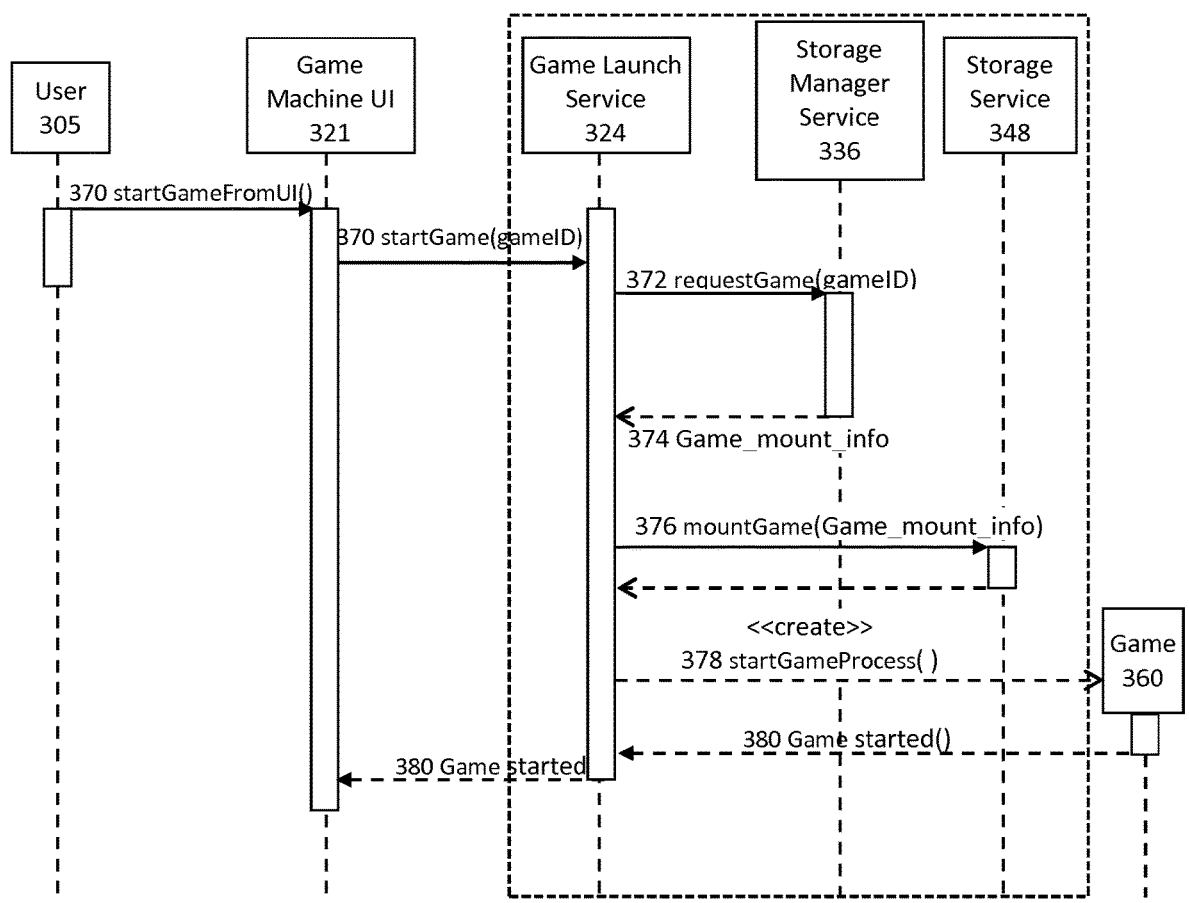
FIG. 3 is a flow diagram illustrating a game start initiated from a streamed user interface (UI) in accordance with an aspect of the present disclosure.

An illustrative example of a second method of initializing an application or game and streaming the output data to a client computing device is provided in FIG. 3. In the example technique 300 of FIG. 3, a user selects a desired streaming application from a catalogue of streaming application titles, as opposed to having a streaming client send a request for a pre-selected application title as shown in FIG. 2. Accordingly, the example technique 300 of FIG. 3 may be implemented in a manner similar to that depicted in FIG. 2. However, FIG. 3 provides that a user may select an application from a user interface 321 that is streamed from the Game Server to a streaming client. The user interface may provide the user with a list of applications available for streaming. This user interface (UI) may be streamed to the client after an application on the client computing device is launched, wherein the application's launch may result in the streaming client to connecting to the streaming service of the Game Server in accordance with the architecture described in FIG. 1. The UI may also be rendered client side, for example, using a HTML5-based UI that is served from a CDN or embedded in a client app.

Although for purposes of the current discussion it may be assumed a user interface (UI) is streamed from the same Game Server that ultimately runs the game, aspects of the present disclosure are not limited to such implementations. Alternatively, it is possible for the UI and Game to run on different machines. In that case there may be a 'UI Server' and a 'Game Server'. In such a situation, the UI Server may notify the Game Server on what game it needs to start. In some implementations, but not all, user/game data mounting may happen exclusively on the Game Server.

Once the user selects an application for streaming from the user interface, a request 370 to start a particular game "startGameFromUI" is sent from the client computing device through the user interface to the game launch service 324. The request 370 is optionally sent through the Management Server and utilized by the management service in order to perform those management functions as described with respect to FIG. 1 (powering on the Game Server, etc.). In an alternative embodiment, the Management Server may perform those management functions described with respect to FIG. 1 upon receiving the request to connect the client computing device to the game machine UI.

If the UI is completely server side, e.g., as discussed above, then such a startGameFromUI may stay completely server side. In such implementations, when a user selects a game to play some form of authentication may happen after which game startup takes place. In some implementations, the UI may also just show games which the user is authorized to play without having to do an extra authentication at startup. If the UI is completely server side, game startup may take place by the UI sending a game start request to the Game Launch Service 224, which would initiate a game start as discussed above including game data mounting.

Alternatively, a startGameFromUI request could come from the client if the UI was completely client side. For example, in some implementations, the game catalog may be located client side, which results in a startup flow depicted by FIG. 2. There is no direct communication flow between client and game server for game startup. However, for next generation servers there may be some form of communication path between client and game server because of new features. This may pave the road for a direct startGameFromUI request between client and server. By way of example, and not by way of limitation one possible use case is 'game switching on the same server'. Currently if user is playing game A and wants to play game B, a switch of Game Servers takes place in the absence of an ability to start a new game on a Game Server. With a new generation game system in combination with aspects of the present disclosure, it is possible to switch to a new game on the same Game Server. The flow of FIG. 3 implicitly describes this. In the game switching use case, the client side UI could just tell the Game Server 102 to switch to a new game, provided the Game Server is still assigned to that user.

Referring again to FIG. 3, the request 370 is delivered to the game launch service 324 on the Game Server. The game launch service 324 may then request 372 the game information from the storage manager service 336 located on the Storage Server. The storage manager service may check if the game is available for streaming and may additionally check if the requesting user is allowed to play the requested game. In alternative embodiments, such security checks may also be performed on the Management Server and elsewhere for additional security. If the user has the appropriate permissions to play the game, the storage manager service 336 makes the game available on the storage server and provides 'game_mount_info' credentials 374 back to the game launch service 224. The authentication credentials may be just one part of a storage target in game_mount_info, which may include a combination of protocol (e.g., NFS, iSCSI, HTTP, some clustered storage protocol, etc. . . . ), credentials and address. According to aspects of the present disclosure, storage need be provided by a single server, which may be advantageous due to content availability or competing performance requirements.

The game launch service 324 may then mount the game data "mountGame(Game_mount_info)" 376 from the Storage Server, where the game data 360 is stored. The storage service 348 controls the data transfer of the game data. Once the data 376 has been mounted correctly, the game launch service 324 may start the game "startGameProcess" 378, and the output data of the started game 380 may then be streamed to the client computing device provided the streaming service (not shown, discussed with respect to FIG. 1) has initiated audio and video streaming to the user 305.

User data may also be mounted in such a fashion, and user data and user save game data may be available on the storage server or through cloud services, as discussed below. Upon user 305 connection to the game machine UI 321, a 'userID' may be passed from the streaming client to the Game Server, which triggers obtaining access to the user's data stored in the Storage Server. The Storage Server again prepares the user data for the user, which may involve obtaining access to cloud storage if stored elsewhere; FIG. 4 highlights a potential storage architecture with respect to cloud storage. Ultimately, user_mount_info is returned to the Game Sever, which allows it to mount the user data. Depending on the architecture of the system, this mounting may be part of the game launch service 324 or there may be a user login service. In an alternative embodiment of the present disclosure, additional users may "join" a streaming session once the session has been started. An additional user may connect to the streaming session, for example, through the connection of a peripheral computing device to the client computing device that is streaming the game data. In an alternative embodiment, an additional user may connect to the streaming session remotely, for example, via connection over a network to the streaming session as permitted by the features of the client device network. Once an additional user has connected or requested a connection to the streaming session, the streaming client may notify the Game Server to add an additional user. The additional user would be added to the streaming session in a manner similar to the above-described manner of mounting user and game data for the user initially requesting the streaming session.

FIG. 4 provides a more detailed overview of the storage architecture according to various implementations of the present disclosure. In the example storage server architecture 400, a Game Server 402 is connected to a Storage Server 406 over a network connection 404. The network connection may be a local connection or an internet connection, e.g., a transmission control protocol (TCP) or user datagram protocol (UDP) connection. The Game Server 402 may contain a boot loader 411. The boot loader may contain an operating system kernel 413 and a small amount of user application space 415. Accordingly, the Game Server does not load operating system or user application space data from a hard drive or optical drive contained within the Game Server. The function of the boot loader 411, according to various implementations of the present disclosure, is to provide sufficient instruction to the Game Server 402 such that the Game Server may locate and utilize the operating system data 425 stored on the Storage Server 406. This function may be performed with respect to the example architecture of FIG. 1, wherein a management server assists the Game Server in locating the necessary operating system data. Additionally, with respect to the example embodiments of FIGS. 2 and 3 above, the Game Server 402 may contain mounted operating system data 405, mounted game data 407, and mounted user data 409 once a streaming session has been initiated.

The Storage Server 406 may contain operating system data 425 for one or more game servers, application or game data 427 for one or more applications or games, and user data 429 for one or more users. The data stored in the Storage Server 406 may be encrypted, such that the data is only readable by the Game Server 402. Game and user data is indeed typically encrypted. Currently any game server is always able to open any user data since the same encryption keys are used. In some implementations, additional security may be implemented by providing a different key for each user. In such implementations, the Game Server 102 may be configured to obtain the keys needed for a given user to be able to read the data. In other implementations, there may be some additional authentication steps before the Storage Server 106 gives access to the data of a certain user. This would be to prevent someone who hacks the Game Server to be able to access data of an arbitrary user.

Certain implementations may also use network based access control (e.g. IP address/port filtering), network authentication and operating system permissions (the Game Server operations are limited to a single system user account and much of this via read-only network exports) to further restrict information the Game Server 402 can access. In other implementations, authentication could also be implemented via a time-limited access tokens (e.g. a Kerberos token) that are revoked after their intended use rather than with a fixed credential (e.g. a user ID or password).

The Storage Server 406 may be capable of updating the data stored therein in a manner consistent with operating and initializing the most recent version corresponding system or application. The Storage Server may also be capable of requesting and receiving additional user data 480 from a save data server 475, which may contain user data such as user account data or user data pertaining to saved game states of specific applications, for example. The Storage Server 406 may be connected to the save data server 475 via a cloud or network connection 450, or via management bus or local connection.

Figure 5:
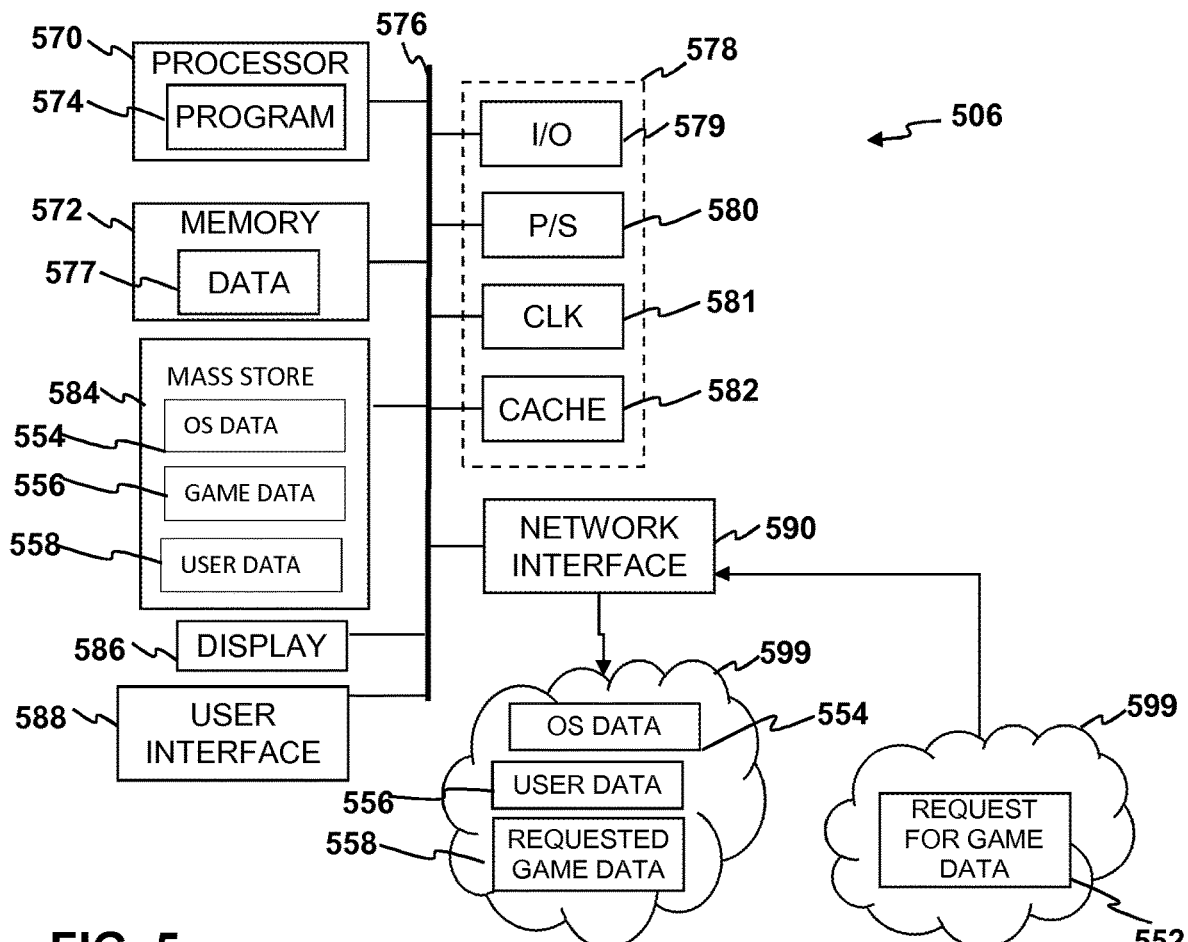
FIG. 5 is a block diagram of an example system in accordance with certain aspects of the present disclosure.
Figure 5:
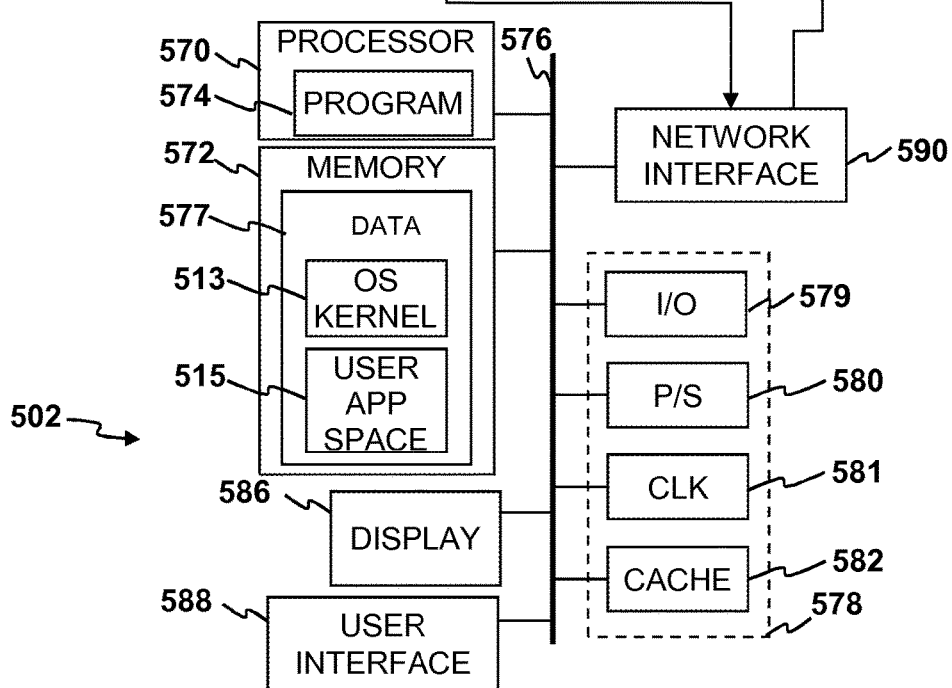

By way of example, and not by way of limitation, FIG. 5 provides a more detailed overview of a distributed computing system that includes two devices 502 and 506 according to various implementations of the present disclosure, and the computing systems 502 and 506 are configured to transfer data over a network in accordance with certain aspects of the present disclosure. These devices 502 and 506 may be configured to execute instructions that have one or more aspects in common with those described with respect to FIGS. 1-4. Either or both the devices 502 and 506 may be configured with a suitable software and/or hardware to implement various aspects of the methods described herein. Either or both the devices 502 and 506 may be a server, an embedded system, mobile phone, personal computer, laptop computer, tablet computer, portable game device, workstation, game console, wearable device such as a smart watch, and the like.

In accordance with certain implementations, the device 502 may be a Game Server, and the device 506 may be a Storage Server. The Game Server 502 may send a request for game data 554 to the Storage Server 506 over a network 599 using an internet or local connection. The request 552 may have initially been sent or processed by, for example, a remote client computing device, a streaming client, a streaming application utilizing a user interface and catalog of available application titles, or a management server.

Either of the devices 502 and 506 may include one or more processor units 570, which may be configured according to well-known architectures, such as, e.g., single-core, dual-core, quad-core, multi-core, processor-coprocessor, cell processor, and the like. Either of the devices 502 and 506 may also include one or more memory units 572 (e.g., RAM, DRAM, ROM, and the like). The processor unit 570 may execute one or more programs 574, which may be stored in the memory 572, and the processor 570 may be operatively coupled to the memory 572, e.g., by accessing the memory via a data bus 576. The memory unit 572 may include data 577, and the processor unit 570 may utilize the data 577 in implementing the program 574. The data 577 for either of the systems 502 and 506 may include, e.g., a request for game data 552 transmitted from the Game Server 502 to the Storage Server 506, and operating system data 554, user data 556, or requested game data 558 from the Storage Server 506 to the Game Server 502 according to various aspects of the present disclosure. The program 574 may include optionally instructions that, when executed by a processor, perform one or more operations associated with providing a request for game data 552, or delivering operating system data 554, user data 556, or requested game data 558 such as, e.g., a method having one or more features in common with the methods of FIGS. 1, 2, 3, and/or 4. For example, the program 574 of the Game Server 502 may include instructions that, when executed by the processor 570, cause the device to request game data from the at least one recipient device 506 and/or deliver requested game data 558 in response to a request for an asset 552 from the remote client computing device (not pictured) delivered by the Game Server 502, in accordance with aspects of the server architecture depicted in FIG. 1 and/or the streaming session initiation methods depicted in FIG. 2 and/or FIG. 3. The program 574 of the Storage Server 506 may include instructions that, when executed by the processor 570, cause the storage server to deliver operating system data 554, user data 556, or requested game data 558 that can then be utilized by the Game Server 102 in accordance with aspects of the streaming session initiation methods depicted in FIG. 2 and/or FIG. 3.

In some implementations, the data 577 stored in the memory 572 of the Game Server 502 will contain only an OS kernel 513 and user application space data 515, in accordance with aspects of the server architecture depicted in FIG. 4. Accordingly, in this example implementation, the request for game data 552 delivered by the Game Server 502 to the Storage Server 506 will result in the Storage Server 506 delivering necessary operating system data 554 to the Game Server 502 so that the Game Server 502 may execute the desired program 574 required to initiate game data 556 for delivery to a streaming client or client computing device.

In certain implementations of the present disclosure, the Storage Server 506 may include one or more devices for mass storage 584, in which operating system data 554, user data 556, or application or game data 558 is stored. By way of example, and not by way of limitation, the mass storage 584 may include a disk drive, CD-ROM drive, flash storage, tape drive, Blu-ray drive, or the like to store programs and/or data. The mass storage may contain the OS kernel and user application space data. The data stored in the mass storage 584 may be encrypted, and may not be readable by the Storage Server 506. In certain implementations, the data stored in the mass storage 584 may only be readable by the Game Server 502. A management server may be able to point either the Game Server 502 or Storage Server 506 to the appropriate application or game data 554 with respect to a game data request 552, in accordance with aspects of the streaming architecture depicted in FIG. 1. However, in certain embodiments, the management server is also unable to read the stored game data 554.

Either of the devices 502 and 506 may also include well-known support circuits 578, such as input/output (I/O) circuits 579, power supplies (P/S) 580, a clock (CLK) 581, and cache 582, which may communicate with other components of the system, e.g., via the bus 576. Either of the devices 502 and 506 may optionally include a mass storage device 584 such as a disk drive, CD-ROM drive, tape drive, flash memory, or the like, and the mass storage device 584 may store programs and/or data. However, in certain implementations, the Game Server device 502 might not contain a mass storage 584. Either of the devices 502 and 506 may also optionally include a display unit 586. The display unit 586 may be in the form of a cathode ray tube (CRT), flat panel screen, touch screen, or other device that displays text, numerals, graphical symbols, or other visual objects. In some implementations the game server 502 and storage server 506 may omit some of these components (e.g. HDMI port, sound card, WiFi, USB and other interface ports) to reduce costs, e.g., if there is no physical user interaction with the Game Server hardware. In such cases, the game server 502 and storage server 506 may still include a dedicated graphics accelerator (GPU), but it need not render them to the display 586. In some implementations, the display itself may be omitted.

Either of the devices 502 and 506 may also include a user interface 588 to facilitate interaction between the device 502/506 and a user. The user interface 588 may include a keyboard, mouse, light pen, game control pad, touch interface, or other device. The user interface may also include an audio I/O device, such as a speaker and/or microphone. Portions of the user interface 588 may include a graphical user interface (GUI) that can be displayed on the display unit 586 in order to facilitate user interaction with the system 502/506.

A user may interact either of the computer systems through the user interface 588. By way of example, the device may 502 may be a cloud gaming server, and the device 506 may be a cloud storage server, and a user may interact with a video game or application executed by the Game Server 502 and streamed to the client computing device through a streaming client connected to the Game Server 502 by a network interface. The system 502/506 may include a network interface 590, configured to enable the use of Wi-Fi, an Ethernet port, or other communication methods, e.g. a local network or cellular communication through a service, such as LTE, that can provide a connection with acceptable bandwidth and latency. The network interface 590 may incorporate suitable hardware, software, firmware or some combination thereof to facilitate communication via a telecommunications network, and may support data transport using an unreliable protocol in accordance with certain aspects of the present disclosure. The network interface 590 may be configured to implement wired or wireless communication over local area networks and wide area networks such as the Internet. Either of the devices 502 and 506 may send and receive data and/or requests for files via one or more data packets 599 over a network.

The above components may be implemented in hardware, software, firmware, or some combination thereof.

CONCLUSION

It is noted that aspects of the present disclosure have been described with reference to cloud gaming as a particular example in which a need for mass storage virtualization in accordance with various implementations of the present disclosure may be desirable, but implementations of the present disclosure are not so limited. Implementations of the present disclosure may provide mass storage device for emulation for any computing device, which may not involve cloud computing or cloud gaming.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature described herein, whether preferred or not, may be combined with any other feature described herein, whether preferred or not. In the claims that follow, the indefinite article "a", or "an" refers to a quantity of one or more of the item following the article, except where expressly stated otherwise. The appended claims are not to be interpreted as including means-plus-function limitations, unless such a limitation is explicitly recited in a given claim using the phrase "means for."

What is claimed is:

1. A game server system, comprising:
a management server;
a cloud service server separate from the management server;
a network storage server;
a game server having a processor, and a memory coupled to the processor;
wherein the processor and network storage server are connected to each other and to a remote client device via one or more networks;
wherein the game server is configured to perform a method, the method comprising:
receiving, from the remote client computing device, a user request to stream a computer application, wherein the request to run a computer application is received after being passed through the management server, wherein the cloud service server assigns the remote client computing device to the game server in response to the streaming request from the remote client computing device and authenticates the remote client computing device, wherein the management server allocates resources of a network storage server for use in response to the request to run the computer application;
requesting operating system (OS) data and application data necessary to load and/or execute the computer application from the network storage server, wherein the network storage server contains OS data and is coupled to the game server remotely through a network;
receiving the OS data and application data necessary to run the computer application from the network storage server;
running the computer application using the OS data;
streaming an output generated by running the computer application using the OS data to the remote client computing device;
receiving a new request from the remote client computing device to switch to a new application;
sending a request for the new application to the network storage server;
receiving the new application from the network storage server;
running the new application and streaming an output generated by running the new application to the remote computing device.

2. The game server system of claim 1, wherein the network storage device contains encrypted application data that cannot be decrypted by the network storage device.

3. The game server system of claim 2, wherein the processor decrypts the encrypted application data.

4. The game server system of claim 1, wherein the network storage device contains user data.

5. The game server system of claim 4, further comprising analyzing the user data to determine if the user has permission to run the requested application.

6. The game server system of claim 4, wherein the network storage device retrieves additional user data from a save data server.

7. The game server system of claim 6, wherein the network storage device is connected to the save data server via a network connection.

8. The game server system of claim 1, wherein the OS data necessary to run the computer application includes additional OS data.

9. The game server system of claim 1, wherein the network storage device is automatically updated such that the data delivered by the network storage device in response to a request is the most recent version of the requested OS data and application data.

10. The game server system of claim 1, wherein the management server is connected to the processor and the network storage device over a network.

11. The game server system of claim 1, wherein the network storage device contains encrypted application data that cannot be decrypted by the management server.

12. The game server system of claim 1, wherein the management server prepares the memory and the processor to deliver the output generated by running the computer application using the OS data and application data to the remote client computing device.

13. The game server system of claim 12, wherein the management server causes one or more components to be powered in response to the request to run the computer application.

14. The game server system of claim 13, wherein the game server system is powered by the management server using a hardware control interface.

15. The game server system of claim 14, wherein the hardware control interface comprises toggling a power switch signal using general purpose input output (GPIO).

16. The game server system of claim 14, wherein the hardware control interface comprises sending a wake up signal over local area network (LAN).

17. The game server system of claim 14, wherein the hardware control interface comprises a universal asynchronous receiver/transmitter (UART) command port.

18. The game server system of claim 1, wherein the management server initiates software updates if a software update is necessary.

19. The game server system of claim 1, wherein the streaming request from the remote client computing device is delivered to the cloud service server through a streaming client utilized by the user.

20. The game server system of claim 1, wherein the cloud service server provides instructions to the streaming client to stream.

21. On a game server configured to operate on a network, a method, comprising:
- receiving, from a remote client computing device, a user request to stream a computer application, wherein the request to run a computer application is received after being passed through a management server, wherein a cloud service server separate from the management server assigns the remote client computing device to a processor of the game server in response to the streaming request from the remote client computing device and authenticates the remote client computing device, wherein the management server allocates storage on a network storage server for use in response to the request to run the computer application;
- requesting operating system (OS) data and application data necessary to load and/or run the computer application from the network storage device, wherein the network storage server contains OS data and is coupled through the network;
- receiving the OS data and application data necessary to run the computer application from the network storage server;
- running the computer application using the OS data;
- streaming an output generated by running the computer application using the OS data to the remote client computing device;
- receiving a request from the remote client computing device to switch to a new application;
- sending a request for the new application to the network storage server;
- receiving the new application from the network storage server;
- running the new application and streaming an output generated by running the new application to the remote computing device.

22. A non-transitory computer readable medium having processor-executable instructions embodied therein, wherein execution of the instructions by a processor of a game server cause the processor to implement a method for sharing assets, the method comprising:
- receiving, from a remote client computing device, a user request to stream a computer application, wherein the request to run a computer application is received after being passed through a management server, wherein a cloud service server separate from the management server assigns the remote client computing device to the processor in response to the streaming request from the remote client computing device and authenticates the remote client computing device, wherein the management server allocates storage on a network storage server for use in response to the request to run the computer application;
- requesting operating system (OS) data and application data necessary to load and/or run the computer application from the network storage server, wherein the network storage server contains OS data for and is coupled through a network;
- receiving the OS data and application data necessary to run the computer application from the network storage server;
- running the computer application; and
- streaming an output generated by running the computer application using the OS data to the remote client computing device;
- receiving a request from the remote client computing device to switch to a new application;
- sending a request for the new application to the network storage server;
- receiving the new application from the network storage server;
- running the new application and streaming an output generated by running the new application to the remote computing device.

* * * * *